United States Patent [19]

Swiden

[11] Patent Number: 4,740,689

[45] Date of Patent: Apr. 26, 1988

[54] ARRANGEMENT FOR AN OPTICAL SPEED INDICATOR

[75] Inventor: Lennart Swiden, Vreta Kloster, Sweden

[73] Assignee: Bygg-Vesta AB, Linkoping, Sweden

[21] Appl. No.: 876,851

[22] PCT Filed: Oct. 21, 1985

[86] PCT No.: PCT/SE85/00404

§ 371 Date: Jun. 12, 1986

§ 102(e) Date: Jun. 12, 1986

[87] PCT Pub. No.: WO86/02737

PCT Pub. Date: May 9, 1986

[30] Foreign Application Priority Data

Nov. 1, 1984 [SE] Sweden .............................. 8405472

[51] Int. Cl.⁴ ..................... H03K 13/02; G01N 21/12
[52] U.S. Cl. ................................ 250/231 SE; 180/197
[58] Field of Search ............ 250/231 SE, 575, 237 G; 324/175; 180/197

[56] References Cited

U.S. PATENT DOCUMENTS

| | | | |
|---|---|---|---|
| 3,714,448 | 1/1973 | Cronan | 250/231 SE |
| 3,809,913 | 5/1974 | Prellwitz | 250/575 |
| 3,954,342 | 5/1976 | Boeke | 250/575 |
| 4,240,066 | 12/1980 | Lenox | 250/231 SE |
| 4,387,374 | 6/1983 | Wiener | 250/231 SE |

Primary Examiner—Edward P. Westin
Assistant Examiner—Khaled Shami
Attorney, Agent, or Firm—Jeffers, Hoffman & Niewyk

[57] ABSTRACT

Arrangement for an optical speed indicator intended to form part of the system for the anti-lock braking of a vehicle wheel. The speed indicator has a rotationally symmetrical device (1) operatively connected with the wheel, said device being executed with equidistant openings (4) or the like, a light source (2) positioned on one side of said device (1) and so arranged as to illuminate said openings (4), and a detector (3) positioned on the other side of said device (1) and so arranged as to generate a signal pulse each time it is struck via an opening (4) by light from the light source (2). A characteristic feature of the invention is that the arrangement includes a nozzle (8) communicating with the brake cylinder (7) of the vehicle wheel in such a way that the quantity of air discharged from the cylinder (7) via the nozzle (8) during braking produces a jet of air so arranged as to prevent the speed indicator from becoming contaminated with dirt.

2 Claims, 2 Drawing Sheets

ARRANGEMENT FOR AN OPTICAL SPEED INDICATOR

The present invention relates to an arrangement for an optical speed indicator intended to form part of a system for the anti-lock braking of a vehicle wheel having a rotationally symmetrical device operatively connected with the wheel, said device being executed with equidistant openings or the like, a light source positioned on one side of said device and so arranged as to illuminate said openings, and a detector positioned on the other side of said device and so arranged as to generate a signal pulse each time it is struck via an opening by light from the light source.

Speed indicators of this kind are often positioned in an environment such that the risk of contamination by dirt and of resulting malfunction is remarkably high.

The object of the present invention is by simple means to eliminate or at least to reduce by a considerable amount any malfunctions resulting from contamination by dirt, which is permissible in accordance with the invention through the arrangement including a nozzle communicating with the brake cylinder of the vehicle wheel in such a way that the quantity of air discharged from the cylinder via the nozzle during braking produces a jet of air so arranged as to prevent the speed indicator from becoming contaminated by dirt. The invention permits effective blowing clean, and without the need for special equipment for the control of that function.

In accordance with one particular characteristic feature of the invention, the level of contamination by dirt is reduced further by the rotationally symmetrical device being executed in a previously disclosed fashion with tongues arranged adjacent to the openings, and by the tongues being positioned in such a way that a flow of air which interacts with the jet of air from the nozzle is obtained from them.

The invention is described in greater detail below with reference to the accompanying drawings, of which FIG. 1 illustrates diagramatically and in perspective view an illustrative embodiment of an arrangement in accordance with the invention.

Figure 1:
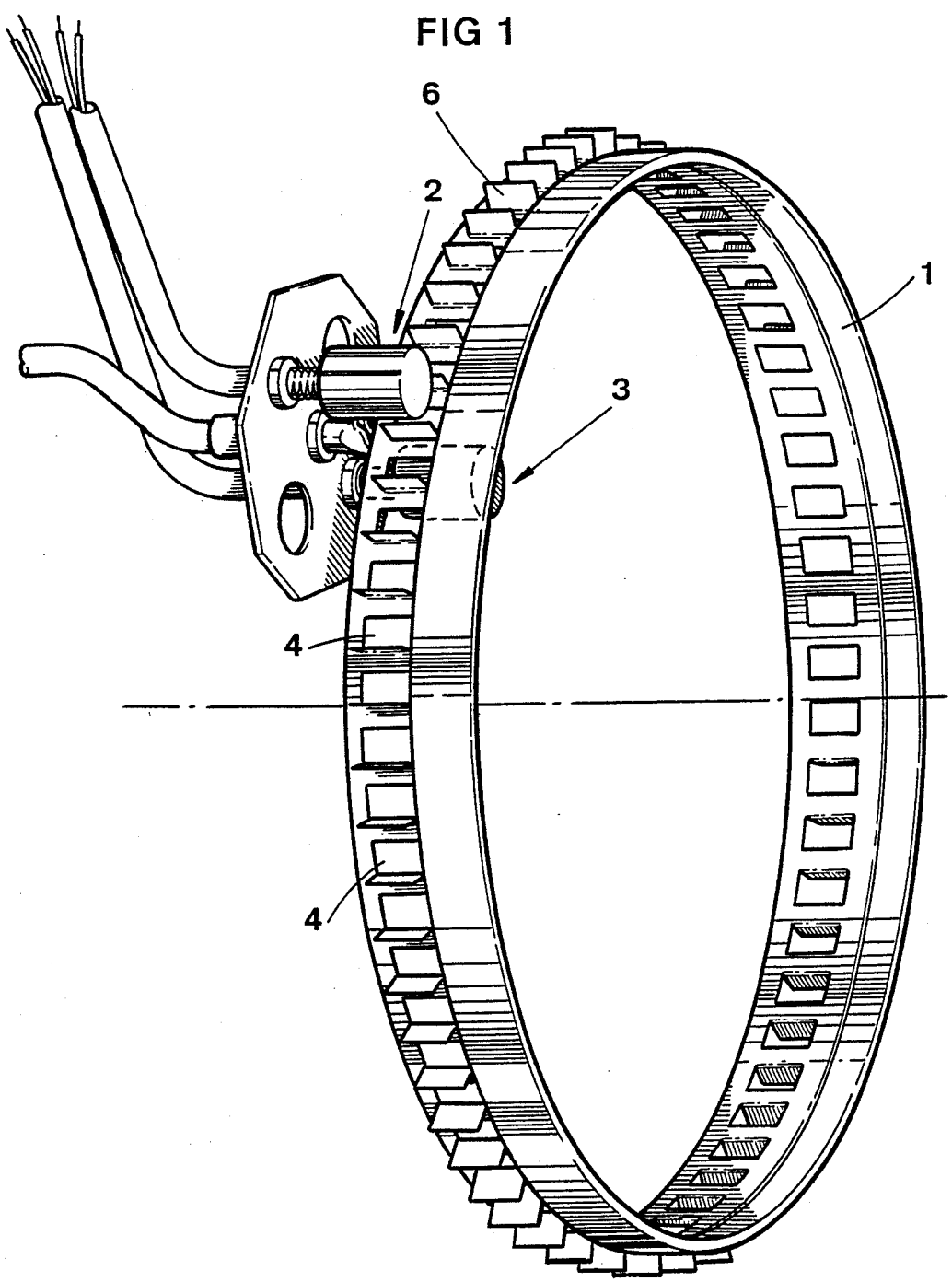
Figure 2:
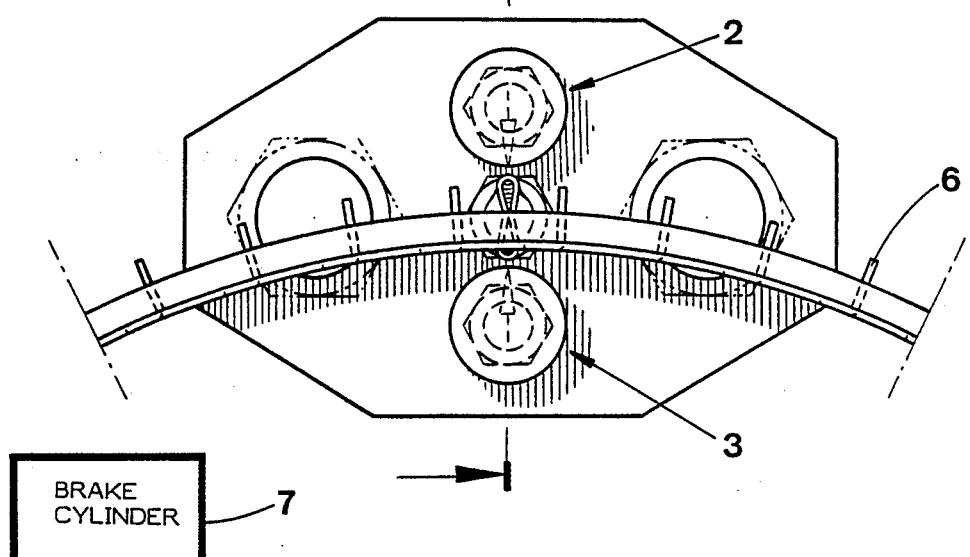
FIG. 2 illustrates a plan view from the side.
Figure 3:
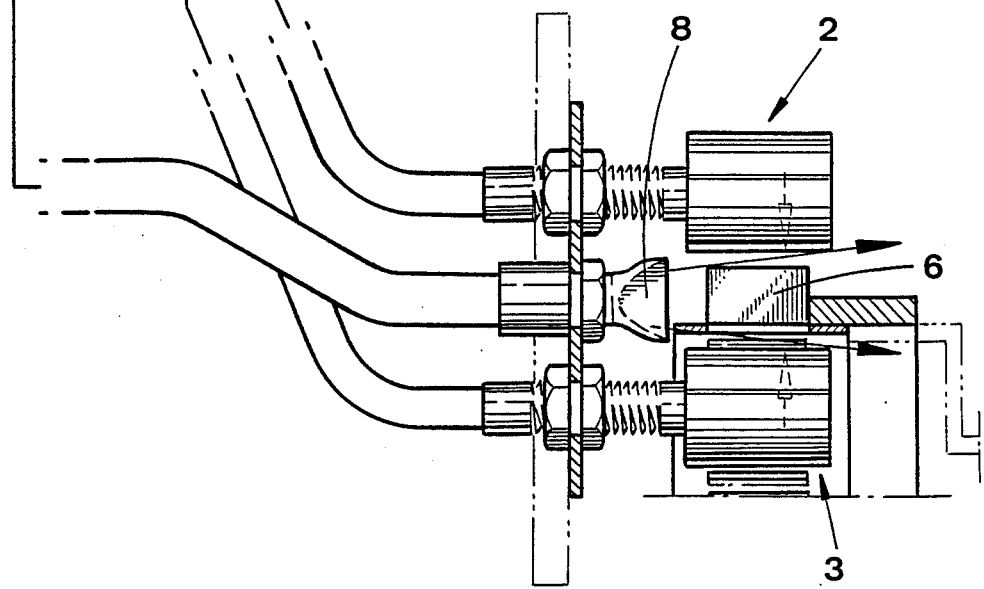
FIG. 3 illustrates a plan view from above of the arrangement in accordance with FIG. 1.

The arrangement in accordance with the invention comprises a rotationally symmetrically device 1, consisting in the design illustrated in the drawing of an annular part of the outer surface of a cylinder, and of a light source 2 and a photocell 3 positioned to either side of the ring 1. The ring 1 is operatively connected to a vehicle wheel, the rotational speed of which is to be measured. Neither the aforementioned vehicle wheel nor the operative connection are shown in the drawing. The ring 1 is executed with equidistant openings 4 which are illuminated by the light source 2. When these pass by the photocell 3 as the ring 1 rotates, a series of electrical impulses is produced in a previously disclosed fashion, the frequency of which provides an indication of the speed of rotation of the wheel. The series of impulses is processed in a manner appropriate for the purpose by means of a computer device 5 connected to the photocell 3.

A nozzle 8 communicating with the brake cylinder 7 of the vehicle wheel is present in accordance with the invention in order to prevent the contamination by dirt of the component parts of the speed indicator. In the design illustrated in the drawing, this nozzle is arranged between the light source 2 and the photocell 3 and is so arranged as to produce a jet of air by means of which the optical surfaces of the light source 2 and the photocell 3 are primarily kept free from dirt. The jet of air is produced each time braking by means of the handbrake or the footbrake ceases. This is also the case for the electronically controlled pulsed braking provided by the antilock braking system. The first-mentioned case is especially advantageous because dirt may have collected on the detector devices after the vehicle has remained stationary for a certain time. The accumulated dirt is thus blown away with the help of a jet of air which is produced in conjunction with the release of the handbrake.

In a particularly advantageous embodiment of the invention, projecting tongues 6 are arranged in a previously disclosed fashion adjacent to the openings 4. In the embodiment illustrated in the drawing, these tongues project in the manner of fan blades radially outwards from the ring 1, which thus acts simultaneously as a centrifugal fan as it rotates, producing an air flow which additionally prevents contamination of the speed indication by dirt.

It is obvious that the fan blades 6 can be angled in different ways within the scope of the idea of invention in order to produce the greatest possible dirt-preventing effect, having regard for the relative positions of the light source 2, the photocell 3 and the nozzle 8.

I claim:

1. An optical speed indicator arrangement for an anti-lock braking system for a vehicle wheel, an air-operable brake with a brake cylinder, said speed indicator arrangement comprising:
    a rotationally symmetric device operatively connected to a wheel, which symmetric device has a plurality of one of equidistant openings and the like, said device having a first side and a second side;
    a light source positioned on one of said first side and second side, which light source is operable to illuminate said openings;
    a detector positioned on the other one of said first side and second side, said detector operably arranged to generate a pulse each time it is struck by light from said light source through said openings;
    an air nozzle generally positioned to direct a jet of air to said speed indicator, said nozzle coupled to said brake cylinder and operable to communicates the air discharged from said wheel brake cylinder during braking to said speed indicator to prevent its contamination by dirt.

2. An optical speed indicator arrangement as claimed in claim 1 wherein said symmetric device openings include tongues adjacent to said openings, which tongues are positioned to provide a flow of air interactive with said jet of air from said nozzle.

* * * * *